United States Patent
Ahmed (10) Patent No.: US 11,048,820 B2
(45) Date of Patent: Jun. 29, 2021

(54) ANONYMIZED DATA STORAGE AND RETRIEVAL

(71) Applicant: SAP SE, Walldorf (DE)

(72) Inventor: Naved Ahmed, Kolkata (IN)

(73) Assignee: SAP SE, Walldorf (DE)

( * ) Notice: Subject to any disclaimer, the term of this patent is extended or adjusted under 35 U.S.C. 154(b) by 285 days.

(21) Appl. No.: 15/656,858

(22) Filed: Jul. 21, 2017

(65) Prior Publication Data

US 2019/0026490 A1 Jan. 24, 2019

(51) Int. Cl.
G06F 21/00 (2013.01)
G06F 21/62 (2013.01)
G06F 16/23 (2019.01)

(52) U.S. Cl.
CPC .......... *G06F 21/6254* (2013.01); *G06F 16/23* (2019.01)

(58) Field of Classification Search
CPC .............................. G06F 21/6254; G06F 16/23
See application file for complete search history.

(56) References Cited

U.S. PATENT DOCUMENTS

| | | | | |
|---|---|---|---|---|
| 2015/0033356 A1* | 1/2015 | Takenouchi | ........ | H04L 63/0407 726/26 |
| 2015/0095589 A1* | 4/2015 | Park | ...................... | G06F 12/122 711/141 |
| 2016/0379011 A1* | 12/2016 | Koike | ................... | G06F 16/285 726/26 |
| 2017/0243028 A1* | 8/2017 | LaFever | .............. | G06F 21/6254 |
| 2018/0004978 A1* | 1/2018 | Hebert | ................ | G06F 16/2457 |
| 2018/0012039 A1* | 1/2018 | Takahashi | ............... | G06F 21/62 |

* cited by examiner

*Primary Examiner* — Anthony D Brown
*Assistant Examiner* — Rodman Alexander Mahmoudi
(74) *Attorney, Agent, or Firm* — Erise IP, P. A.

(57) ABSTRACT

Systems and methods for applying k-anonymity to data from a database are provided. An initial extraction of data from a database is performed. Initial anonymized data is produced based on the extracted data and a configuration of quasi-identifiers. An actual k-anonymity level is calculated based on the initial anonymized data. The actual k-anonymity level is compared to a desired k-anonymity level. The configuration of quasi-identifiers is adjusted based on the comparison. The calculating, comparing, and adjusting are iteratively repeated until the actual k-anonymity level equals the desired k-anonymity level or the adjusted configuration of quasi-identifiers has reached a limit. Final anonymized data is produced based on the adjusted configuration of quasi-identifiers. A subsequent extraction of data from the database is performed. Subsequent anonymized data is produced based on the extracted subsequent data and the adjusted configuration of quasi-identifiers. The actual k-anonymity level is calculated based on the subsequent anonymized data.

20 Claims, 4 Drawing Sheets

ANONYMIZED DATA STORAGE AND RETRIEVAL

TECHNICAL FIELD

The technology described herein relates generally to the anonymization of large data sets for storage and retrieval.

BACKGROUND

Organizations collect, store, and analyze large data sets to achieve multiple objectives, including, enhancing business intelligence, facilitating decision making, reducing costs of matters, and discovering new opportunities. With growing problems such as unauthorized access of data systems and identity theft, ensuring that the stored data is anonymized and thus properly secured, can be crucial. In addition, data protection and privacy legislation and guidelines may dictate that anonymization and security measures are pursued. When data is anonymized successfully, the impact of inadvertently allowing unauthorized users to access sensitive data can be minimized. Though successful anonymization can reduce the impact of unauthorized access of data, there is a tradeoff; the greater the anonymization, the greater the information loss. Information loss can make it challenging for organizations to meet the foregoing objectives through meaningful data analysis.

SUMMARY

K-anonymization is applied to data from a database. An initial extraction of data from a database is performed. Initial anonymized data is produced based on the extracted data and a configuration of quasi-identifier. An actual k-anonymity level is calculated based on the initial anonymized data. The actual k-anonymity level is compared to a desired k-anonymity level. The configuration of quasi-identifiers is adjusted based on the comparison. The calculating, comparing, and adjusting are iteratively repeated until the actual k-anonymity level equals the desired k-anonymity level or the adjusted configuration of quasi-identifiers has reached a limit. Final anonymized data is produced based on the adjusted configuration of quasi-identifiers.

A subsequent extraction of data from a database is performed. Subsequent anonymized data is produced based on the extracted subsequent data and the adjusted configuration of quasi-identifiers. The actual k-anonymity level is calculated based on the subsequent anonymized data.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The anonymized data pool (ADP) system and methods as provided herein build upon on the concept of data anonimization. Data has the k-anonymity property if the individuals or entities who are subjects of the data cannot be distinguished from at least k−1 individuals or entities. The ADP system allows a user to set the desired k-anonymity level, applies anonymization techniques to data that it collects from live databases, and checks whether the desired k-anonymity level is reached. If the desired k-anonymity level is not reached, the user can adjust the configuration used to anonymize the data. The system can combine data from multiple sources, including different tables within a database or from multiple databases. The ADP system provides a customizable solution for anonymizing data from start to finish that will allow a user to optimize the tradeoff between data privacy and information analysis. This anoymized data can later be retrieved through various queries and the like.

Figure 1:
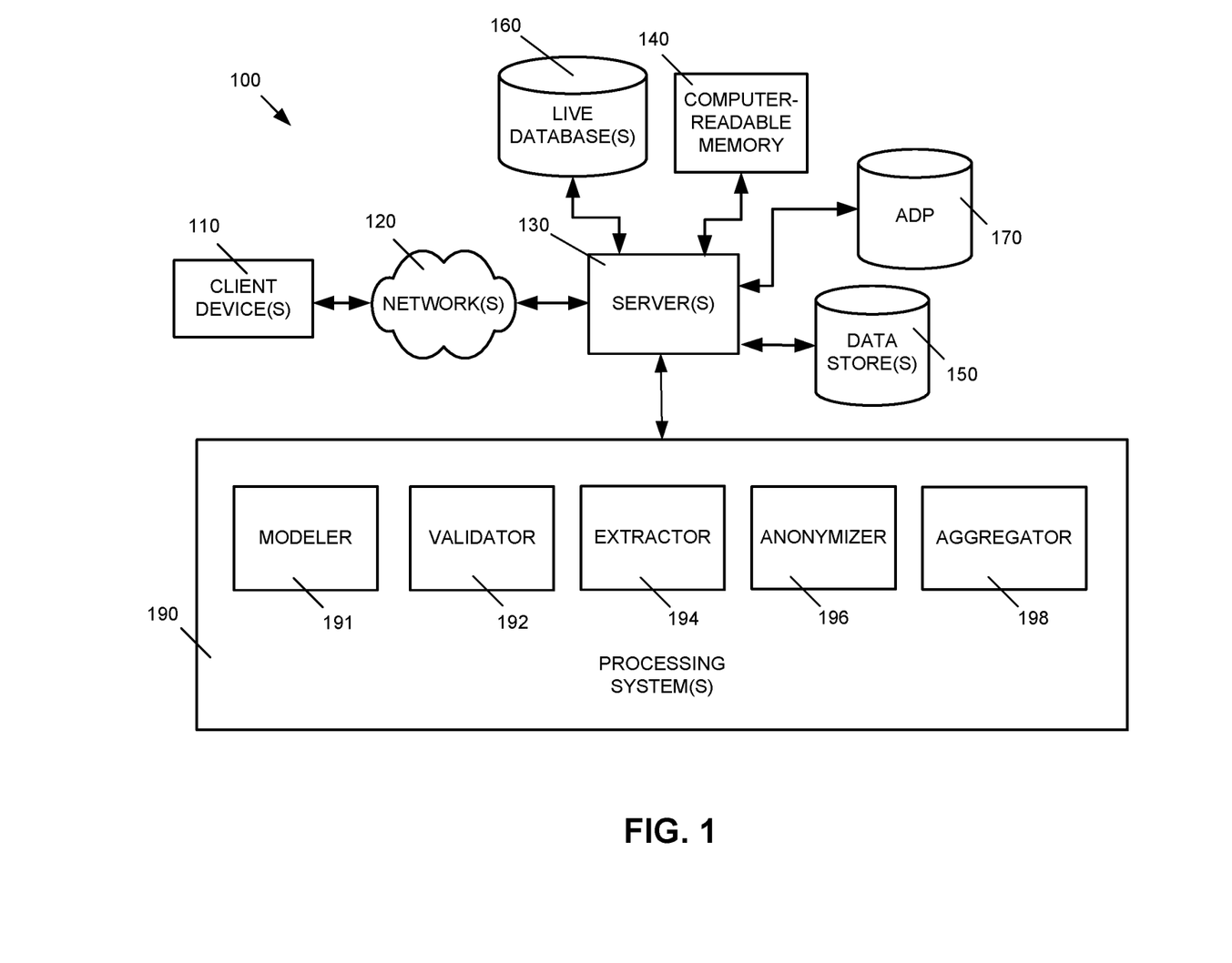
FIG. 1 illustrates the components of an exemplary Anonymized Data Pool (ADP) system for applying the k-anonymity property to data from one or more live databases.

FIG. 1 illustrates the components of an exemplary ADP system for applying the k-anonymity property to data from one or more live databases. In the ADP system 100, one or more client devices 110 can display a GUI that allows a user to customize parameter configurations used by various components in the system. The one or more client devices 110 can send data over one or more networks 120 to one or more servers 130. The one or more servers 130 can process the data and transmit the various parameter configurations to one or more processing systems 190. The one or more processing systems 190 can access the one or more servers 130. The one or more servers 130 can access computer-readable memory 140 as well as one or more data stores 150. The one or more processing systems 190 include a modeler 191, a validator 192, an extractor 194, an anonymizer 196, and an aggregator 198. The modeler 191 provides a model that defines the extraction parameters and an anonymization parameter configuration. The validator 192 provides a configuration that determines what data can be extracted from one or more live databases 160. The extractor 194 processes the model from the modeler 191 and the configuration from the validator and applies the model and the configuration to the data from the one or more live databases 160. The extractor 194 sends data to the anonymizer 196 that runs on the one or more processing systems 190. The anonymization parameter configuration produced by the modeler can be used by the anonymizer 196 and applied to the data from the extractor 194. The aggregator 198 produces aggregated data based on the anonymized data from the anonymizer 196, or alternatively, it produces aggregated data based on the extracted data from the extractor 194. The GUI provides interactive visualizations for all the runtime components, including the validator 192, the extractor 194, the anonymizer 196, and the aggregator 198. The ADP 170 includes the anonymized data. The one or more live databases 160 can be connected to one or more servers 130 to the ADP system 100 or alternatively, the one or more live databases 160 can be connected to the one or more servers 130 through one or more networks 120.

Figure 2:
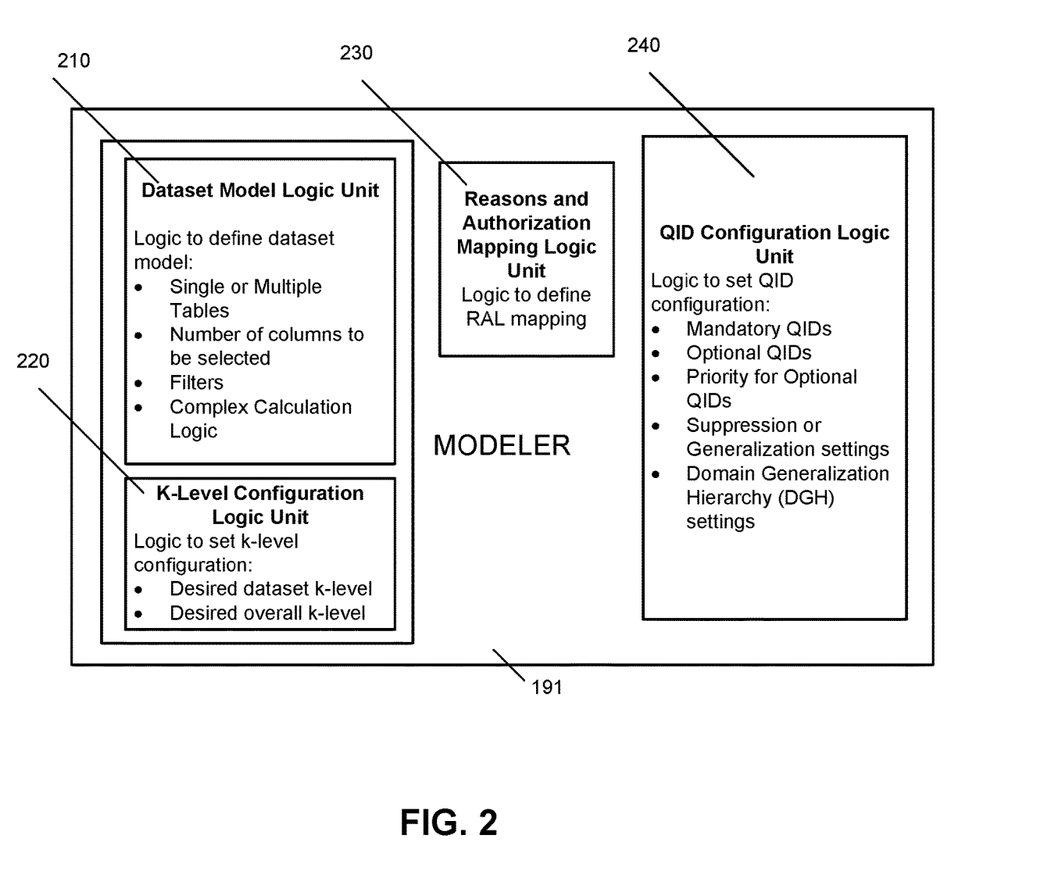
FIG. 2 depicts the logical components contained in the modeler that allow a user, via a graphical user interface, to set configurations to be used by the ADP system.

FIG. 2 depicts the logical components contained in the modeler 191 that allow a user, via a GUI, to set parameter configurations to be used by the ADP system 100. The one or more client devices 110 can display the GUI that sends data to the modeler 191. The GUI allows the user to customize parameter configurations by sending data to a dataset model logic unit 210, a k-anonymity level configuration logic unit 220, a reasons and authorization mapping logic unit 230, and a QID configuration logic unit 240. The data for the foregoing logical components can be stored in the one or more data stores 150.

The dataset model logic 210 can provide a framework for analysis and decision-making in the ADP system 100. It can be used to define the extraction parameters for data to be extracted from the one or more live databases 160. The dataset model can include which tables should be extracted from the one or more live databases 160 and a number of columns to be selected in each table. Furthermore, the dataset model can include filters to be applied to the extracted data, as well as complex calculation logic. The model can be created prior to the ADP system 100 being deployed by a customer, or alternatively, it can be created or modified by customers during deployment of the system.

The k-anonymity level configuration logic 220 allows the user to set a desired k-anonymity level for the system and a desired k-anonymity level for each dataset. If there is not a defined desired k-anonymity level for a particular dataset, the system can use a default level equal to the system's desired k-anonymity level.

The reasons and authorization mapping logic 230 comprises logic to associate business or legal reasons with the datasets. The mapping can control access to the datasets. The mapping is optional, but it can be useful for preventing against attacks on the k-anonymized data when the data is released into the public domain. User access can be restricted through the use of authorization logic. Authorized user access can be logged as another security measure.

The quasi-identifier (QID) configuration logic 240 allows the user to define a set of quasi-identifiers (QIDs), which are attributes exploitable for identifying a person. The QIDs are candidates for anonymization. In k-anonymity, every set of QIDs cannot be related to fewer than k persons. The QID configuration comprises mandatory and optional QIDs. All QIDs are included in a first iteration of an actual k-anonymity level calculation. If a QID is optional, it may be dropped on subsequent iterations of extraction/anonymization to increase the k-anonymity level. An optional QID priority determines an order in which optional QIDs are dropped in subsequent iterations. The QID configuration can be created prior to the ADP system 100 being deployed by a customer, or alternatively, it can be created or modified by customers during deployment of the system.

Also included in the QID configuration are suppression and generalization settings. Suppression and generalization are methods that can be used to anonymize data. Suppression consists of replacing the value of an attribute with one or more asterisks. Columns in database tables may contain information such as customer IDs and names that would directly identify a person. This data can be a good candidate for suppression. Generalization consists of replacing the value of an attribute with a more general value that is faithful to the original.

Whichever method is chosen method can be applied to all the values of an extracted database column. This ensures a higher k-anonymity level and hence more privacy. Optionally aggregation can be used to further secure the data. The other method may be chosen for other extracted database columns. Table 1 below highlights the differences between the two anonymization methods.

TABLE 1

| Suppression | Generalization |
| --- | --- |
| Replace the complete attribute value with a suppression mask. Default mask can be "*". Custom mask can be maintained for individual or all QIDs. | Replace the attribute value by a broader category. Levels of generalization can be achieved using Domain Generalization Hierarchy (DGH). |
| For anonymizing a directly identifiable attribute Information Loss is more since the complete value is suppressed. | For anonymizing an indirectly identifiable attribute Information Loss is less since the complete value is not suppressed. |
| Suppression can be also defined as a level-0 generalization. | A generalized attribute can also be used for aggregation. |

Also included in the QID configuration are domain generalization hierarchy (DGH) settings. Generalization can be based on a generalization hierarchy associated with that attribute. The DGH settings include a level and function to achieve different levels of generalization of the data.

To express the relationship between generalization and DGH, a generalization for an attribute can be expressed as a function on A, and each f: A→B can represent a generalization. A generalization sequence or a functional generalization sequence can be expressed as:

$$A_0 \rightarrow A_1 \rightarrow \ldots \rightarrow A_{n-1}$$

Given an attribute A of a database table, a domain generalization hierarchy $DGH_A$ for A can be expressed as a set of functions $f_h$: h=0, . . . , n−1 such that:

$$A_0 \rightarrow A_1 \rightarrow \ldots \rightarrow A_{n-1}$$

$A=A_0$ and $|A_n|=1$. $DGH_A$ is over:

$$\bigcup_{h=0}^{n} A_h$$

An example of a DGH for zip codes can be represented as follows:
$Z_0=\{02138, 02139, 02141, 02142\} \rightarrow Z_1=\{0213*, 0214*\} \rightarrow Z_2=\{021\} \rightarrow Z_3=\{***\}$ Another example of a DGH for race can be represented as follows:
$Z_0=\{Asian, Black, White\} \rightarrow Z_1=\{Person\} \rightarrow Z_2=\{****\}$ The following example illustrates the concepts of QIDs, suppression, and generalization. An example database table can be as shown in Table 2 below.

TABLE 2

| Identifying Variable | Quasi-Identifiers | | Test Result |
|---|---|---|---|
| Name | Gender | Year of Birth | |
| John Smith | Male | 1958 | +ve |
| Alan Smith | Male | 1954 | −ve |
| Alice Brown | Female | 1977 | +ve |
| Tim Green | Male | 1952 | −ve |
| Tammy Roberts | Female | 1978 | −ve |
| Freda Thomas | Female | 1973 | +ve |
| Thomas Taylor | Male | 1969 | −ve |
| Aaron McDonald | Male | 1962 | −ve |

There are 4 attributes and 8 records in the data. Applying 2-anonymization to the database above would yield the results in Table 3 below.

TABLE 3

| | Quasi-Identifiers | | Test Result |
|---|---|---|---|
| Name | Gender | Decade of Birth | |
| * | Male | 1950-1959 | +ve |
| * | Male | 1950-1959 | −ve |
| * | Female | 1970-1979 | +ve |
| * | Male | 1950-1959 | −ve |
| * | Female | 1970-1979 | −ve |
| * | Female | 1970-1979 | +ve |
| * | Male | 1960-1969 | −ve |
| * | Male | 1960-1969 | −ve |

The table above has 2-anonymity with respect to the attributes "Gender" and "Decade of Birth." This means that for any combination of these attributes found in a row of the table there are always at least 2 rows with that exact combination of attributes.

The validator 192 contains the logic to set the validations that have to be performed on the data to be extracted from the live database. The validations can be a sequence of validation entities which can be configured. Some sample validation entities can include: a consent solution, data retention rules, an end of business interaction (EOI) flag, and data status checks. Each one of these validation entities may be mandatory or optional.

The consent solution comprises a determination of whether consent is needed from the customer for extracting sensitive data from the one or more live databases 160 and storing the data in the ADP 170.

The k-level and aggregation method can be a measure of how much data loss the ADP system 100 is allowed to induce. The amount of information loss incurred in the process of transforming (anonymizing and aggregating) the data can be directly related to the utility of the data. In other words, the greater the information loss, the less useful the data becomes. For example, performing meaningful statistical analysis on data that is completely suppressed can be difficult, if not impossible. Because of the tradeoff between information loss and anonymity, the system can use the k-level and aggregation method to optimize the tradeoff.

There are multiple ways to measure information loss. For example, information loss can be measured by the size of anonymization groups. This measure may be based on the intuition that all records in an anonymization group are indistinguishable from one another, as they have the same QID values. Thus, larger groups incur more information loss. Other measures of information loss may take into account the way that values are generalized. Data retention rules need to be evaluated before moving the data from the live database into the ADP 170.

The EOI flag can be an indication of whether the flow of data into the one or more live databases 160 is blocked. Only if it is blocked can the data be moved from the live database to the ADP. The data is blocked from a data protection and privacy perspective once the EOI date is reached and/or any legal data residence periods have elapsed.

Data status checks are indicators that are stored in a table in the ADP that can track every extracted record. This table can contain the hashed value of the primary key of the record. The data status checks ensure that only the data which has not already been moved to ADP is considered for further extractions.

The extractor 194 can use the dataset models to extract the data from the live database and place it into a runtime table. The one or more client devices 110 can display the GUI that sends data to the extractor 194. The GUI can provide interactive visualizations and simulation and record manipulation for k-anonymity level.

The extraction process could be performed either in real-time or triggered (manually or scheduled). Since there should be a sizeable amount of data before the k-anonymity level calculations can be done, triggered extraction is preferable. A second advantage of triggered extraction is that it allows the system to be completely decoupled from the live database.

Copies of tables from the live database can be stored (1:1) in the ADP 170 or they can be joined and stored. Storing 1:1 copies of tables is not very helpful as the tables could be stored with suppressed values of directly identifiable attributes, hence making the tables unsuitable for combining with any other table within ADP 170. Combined tables, such as master data business partner (BP) tables and transactional tables, may contain redundant information, as the same BP attributes would be repeated in multiple rows. However, this is not an issue in some implementations because repeated information is optimized in columnar table storage. Transactional tables, which contain information that changes regularly, can still be stored separately with the master data BP inking information completely suppressed. Based on the purpose of the analysis to be performed on these tables, an appropriate strategy of storing tables will be decided.

The anonymizer 194 can operate differently depending on whether an initial extraction or a subsequent extraction is taking place. For the initial extraction, the desired k-anonymity level of a dataset can be the configured k-anonymity level for that dataset. If not specified, overall desired k-anonymity level can be used. This is different from the actual k-anonymity level of a dataset at run-time.

If the desired k-anonymity level is higher than the actual k-anonymity level, the system can deselect the optional QIDs (one by one) based on the priority and re-calculate the k-anonymity level. If the desired k-anonymity level is reached, the system can stop. Otherwise, this optimal k-anonymity level can be stored for this dataset. After an initial extraction is performed, the following items are stored: k-anonymity level, whether or not aggregation was performed, final QIDs used in the k-anonymity level calculations, and anonymized value sets of the final QIDs.

A simulation mode which shows the k-anonymity level calculations, with an option to commit or reject the calculations, will be available. In this mode, QIDs can be added or removed and anonymization techniques can also be modified. If the user is satisfied with the final k-anonymity level, the calculations can cease and the k-anonymity value can be committed. If the desired anonymity level is not achieved after all the iterations, the k-anonymity level can be increased further by adjusting the QID configuration and/or increasing generalization. Another way that the system can achieve a higher k-anonymity value is to exclude some records from the extraction that are not very business relevant. The initial extraction can be triggered once a large volume of data is available in the one or more live databases 160.

For subsequent extractions, the anonymizer 194 does not use the same iterative approach for calculating k-anonymity as it does for the initial extraction. Since the data from the initial extraction is already anonymized, the QIDs have been finalized. Going forward, the k-anonymity level can be calculated based on additional data, the final QIDs from the initial extraction, existing k-anonymized data in the ADP 170 (when aggregation is not used), and the anonymized value sets of the final QIDs along with the previous k-anonymity level (when aggregation is used). After subsequent extractions, the following items can be stored: k-anonymity level and additional anonymized value sets of the final QIDs.

If the desired anonymity level is not achieved, a simulation mode will be available to do the k-anonymity level calculations. If the user is satisfied with the final k-anonymity level, the calculations can cease and the k-anonymity value can be committed. Otherwise, the k-anonymity level can be increased further by increasing generalization of the final QIDs. Another way that the system can achieve a higher k-anonymity value is to exclude some records from the extraction that are not business relevant.

The greater the anonymization and aggregation, the greater the information loss. Thus, to ensure that the data is analysis-relevant and promises a good degree of data-privacy, the system can allow the user to specify a desired k-anonymity level and if and when aggregation should be performed.

The aggregator 192 performs aggregation on the line items to further enhance data privacy. Aggregation can be performed before anonymization based on the "Group By" parameter in the dataset model 210. In this case, extracted data can be already aggregated and may require minimal further aggregation. Aggregation can also be performed after anonymization based on the final QIDs.

Aggregation becomes restricted for subsequent extractions, as initially extracted line items are no longer present. The anonymized value sets of final QIDs are stored at every extraction when aggregation is used. The anonymized value sets are added to this with every extraction, if not already present. When a k-anonymity level is calculated in an aggregation scenario, these anonymized value sets along with previous k-anonymity levels are considered. Aggregates are calculated from later extractions and added to the aggregates already present in the ADP 170.

As an example, the QIDs from the initial extraction may take the form: {final QIDs: Date of Birth (generalized to year), Zip Code (generalized with 2 characters and 3*), Sex (generalized as person)}.

The anonymized value sets in this example might resemble the following: 4 records each of {1969, 79*, P}, {1978, 79*, P}, {1978, 94*, P}, {1986, 94*, P}. The k-anonymity level is therefore equal to 4, since each of the above sets are repeated 4 times.

The following are examples of subsequent extractions. The incoming data from the database can be of the following scenarios: already in the existing anonymized value sets, or not in the existing anonymized value sets.

One example of a subsequent extraction might be that incoming data has records that can be included in all of the existing value sets. In this example, there can be 1 record each of {1969, 79*, P}, {1978, 79*, P}, {1978, 94*, P}, {1986, 94*, P}. This will result in the k-anonymity level being increased by 1. Therefore, the new k-anonymity level will equal 5.

A second example of a subsequent extraction might be that incoming data has records that can be included in some of the existing value sets. In this example, there can be one or more records of {1969, 79*, P} and {1978, 79*, P}. This will result in the k-anonymity level staying the same value.

A third example of a subsequent extraction might be that incoming data has records that are not in the existing anonymized value sets. In this example, there can be 4 or more records of {2001, 79***, P}. When the number of such items is same or more than the existing k-anonymity level, this will result in the k-anonymity level staying the same value.

A fourth example of a subsequent extraction might be that incoming records have data that is not in existing anonymized value sets, and those records need to be added to the set. In this example, there can be less than 4 records of {2001, 79***, P}. When the number of such items is less than the existing k-anonymity level, this will result in the k-anonymity level being decreased by 1. Therefore, the new k-anonymity level will equal 3.

A sample query to calculate the k-anonymity level may look as follows:

| | |
|---|---|
| SELECT | TOP COUNT(*) AS "k-anonymity level |
| FROM | <<DATASET>> |
| GROUP BY | $QID_1, QID_2.....QID_n$ |
| ORDER BY | COUNT(*) ASC |

The ADP 170 contains the parameter configurations used by the system, runtime temporary tables to be used during runtime, and anonymized and/or aggregated tables.

Runtime tables are used for optimization and for asynchronous checkpoints. For optimization failures, the k-anonymity level calculations can be restarted from the last saved checkpoint. These failures could be due to many reasons like a database memory crash, timeout scenarios, etc. For asynchronous checkpoints, the source of the process does not depend on the receiver of the process for further processing. A further advantage of using runtime tables is that batch modes can be supported.

After anonymization, the ADP 170 stores anonymized tables, which have a valid business purpose relevant for analysis. Additional relevant purposes can be added for the same table. New views can be developed on the existing tables based on business needs. Role-based access can be defined at a table level, a multi-table level, and/or complete ADP level. The tables can be used as data sources for any analytical user interface to assist in decision making.

The ADP system 100 can be used to safeguard data protection and privacy (DPP) in the stored data while allowing the data to be accessed for research and analysis. The system can find varied applications including DPP-enabled data warehousing.

Figure 3:
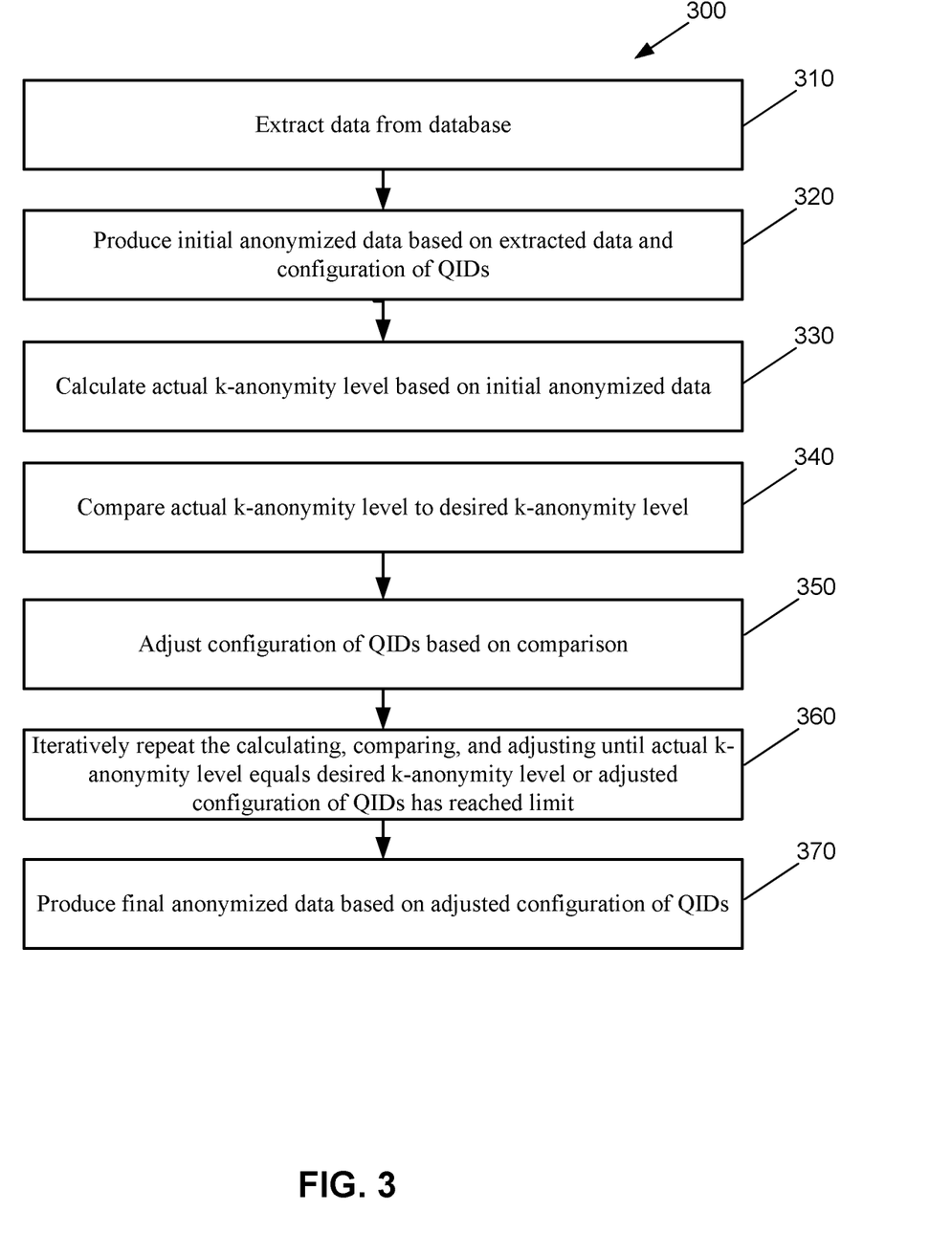
FIG. 3 is a process flow diagram illustrating application of the k-anonymity property to data from one or more live databases.

FIG. 3 is a process flow diagram 300 for the applying k-anonymity to data from a database. At 300, one or more data processors extract data from a database. The one or more data processors produce initial anonymized data based on the extracted data and a configuration of quasi-identifiers at 320. At 330, the one or more data processors calculate an actual k-anonymity level based on the initial anonymized data. The one or more data processors compare the actual k-anonymity level to a desired k-anonymity level at 340. At 350, the one or more data processors adjust the configuration of quasi-identifiers based on the comparison. The calculating, comparing, and adjusting is iteratively repeated until the actual k-anonymity level equals the desired k-anonymity level or the adjusted configuration of quasi-identifiers has reached a limit at 360. At 370, the one or more data processors produce final anonymized data based on the adjusted configuration of quasi-identifiers.

One or more aspects or features of the subject matter described herein can be realized in digital electronic circuitry, integrated circuitry, application specific integrated circuits (ASICs), field programmable gate arrays (FPGAs), computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, can include machine instructions for a programmable processor, and/or can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, solid-state storage devices, memory, and Programmable Logic Devices (PLDs), used to provide machine instructions and/or data to a programmable data processor, including a machine-readable medium that receives machine instructions as a computer-readable signal. The term "computer-readable signal" refers to any signal used to provide machine instructions and/or data to a programmable data processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, such as for example as would a processor cache or other random access memory associated with one or more physical processor cores.

The computer components, software modules, functions, data stores and data structures described herein can be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality can be located on a single computer or distributed across multiple computers depending upon the situation at hand.

Figure 4:
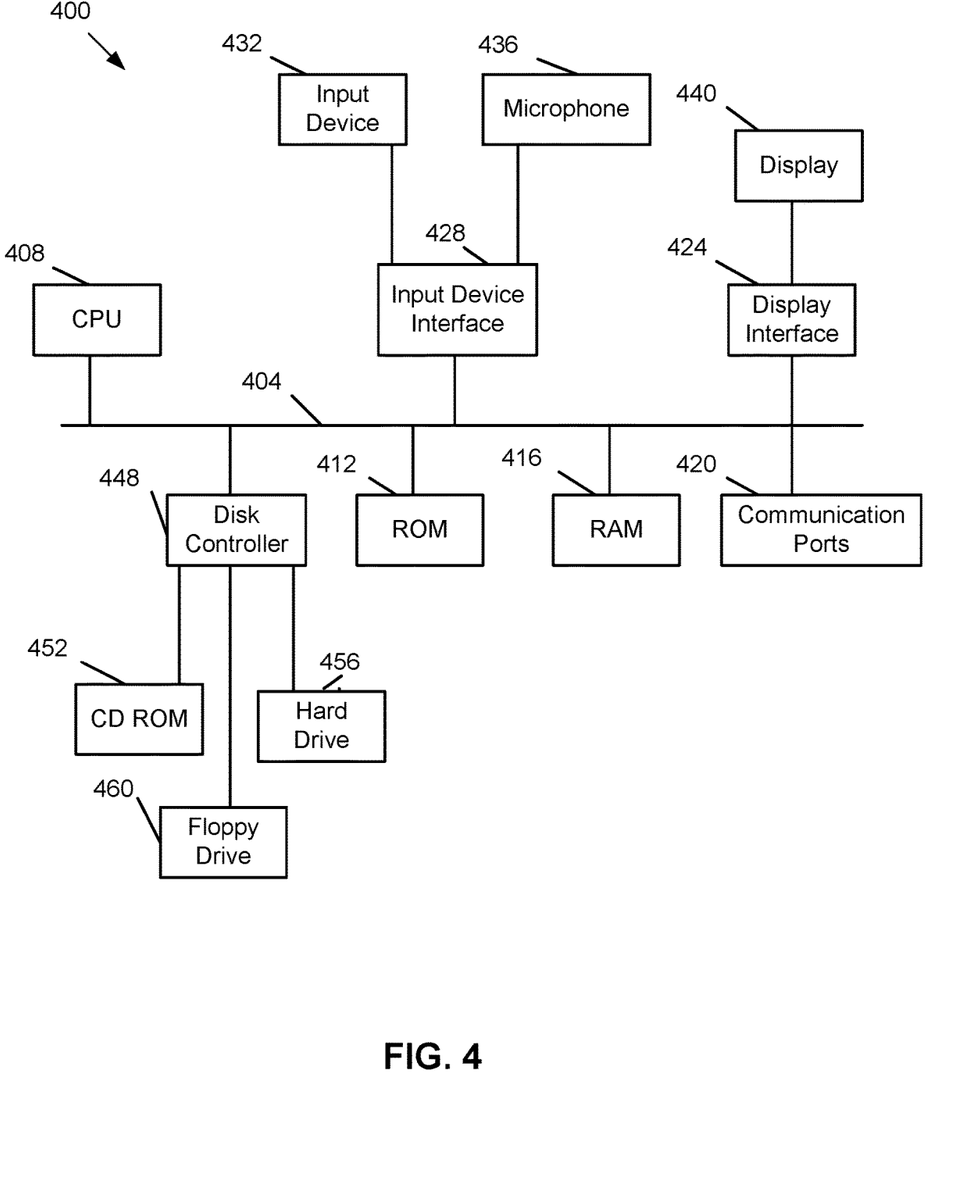
FIG. 4 is a diagram illustrating a sample computing device architecture for implementing various aspects described herein.

FIG. 4 is a diagram 400 illustrating a sample computing device architecture for implementing various aspects described herein, such as any aspect that can be processed using server(s) 160 or processing system 190 executing modeler 191, validator 192, extractor 194, anonymizer 196, or aggregator 198. A bus 404 can serve as the information highway interconnecting the other illustrated components of the hardware. A processing system 408 labeled CPU (central processing unit) (e.g., one or more computer processors/data processors at a given computer or at multiple computers), can perform calculations and logic operations required to execute a program. A non-transitory processor-readable storage medium, such as read only memory (ROM) 412 and random access memory (RAM or buffer) 416, can be in communication with the processing system 408 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 448 can interface one or more optional disk drives to the system bus 404. These disk drives can be external or internal floppy disk drives such as 460, external or internal CD-ROM, CD-R, CD-RW or DVD, or solid state drives such as 452, or external or internal hard drives 456. As indicated previously, these various disk drives 452, 456, 460 and disk controllers are optional devices. The system bus 404 can also include at least one communication port 420 to allow for communication with external devices either physically connected to the computing system or available externally through a wired or wireless network. In some cases, the communication port 420 includes or otherwise comprises a network interface.

To provide for interaction with a user, the subject matter described herein can be implemented on a computing device having a display device 440 (e.g., a CRT (cathode ray tube) or LCD (liquid crystal display) monitor) for displaying information obtained from the bus 404 to the user and an input device 432 such as keyboard and/or a pointing device (e.g., a mouse or a trackball) and/or a touchscreen by which the user can provide input to the computer. Other kinds of input devices 432 can be used to provide for interaction with a user as well; for example, feedback provided to the user can be any form of sensory feedback (e.g., visual feedback, auditory feedback by way of a microphone 436, or tactile feedback); and input from the user can be received in any form, including acoustic, speech, or tactile input. In the input device 432 and the microphone 436 can be coupled to and convey information via the bus 404 by way of an input device interface 428. Other computing devices, such as dedicated servers, can omit one or more of the display 440 and display interface 424, the input device 432, the microphone 436, and input device interface 428.

In the descriptions above and in the claims, phrases such as "at least one of" or "one or more of" can occur followed by a conjunctive list of elements or features. The term "and/or" can also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method for applying k-anonymity to data from a database, the method comprising:
    performing an initial extraction of data from the database, comprising:
        extracting, by one or more data processors, data from the database;
        producing, by the one or more data processors, initial anonymized data based on the extracted data and a configuration of quasi-identifiers, the quasi-identifiers being attributes exploitable for identifying a person;
    calculating, by the one or more data processors, an actual k-anonymity level based on the initial anonymized data;
    comparing, by the one or more data processors, the actual k-anonymity level to a desired k-anonymity level;
    adjusting, by the one or more data processors, the configuration of quasi-identifiers based on the comparing;
    iteratively repeating the calculating, comparing, and adjusting until the actual k-anonymity level equals the desired k-anonymity level or the adjusted configuration of quasi-identifiers has reached a limit; and
    producing, by the one or more data processors, final anonymized data based on the adjusted configuration of quasi-identifiers;
    wherein:
        there are mandatory and optional quasi-identifiers;
        the optional quasi-identifiers have priority identifiers;
        all quasi-identifiers are included in a first iteration of the actual k-anonymity level calculation;
        optional quasi-identifiers are selectively dropped on a one-by-one basis from each iteration of the actual k-anonymity level calculation based on their respective priority identifier subsequent to the first iteration.

2. The computer-implemented method of claim 1, further comprising:
    performing a subsequent extraction of data from the database, comprising:
        extracting, by the one or more data processors, subsequent data from the database;
        producing, by the one or more data processors, subsequent anonymized data based on the extracted subsequent data and the adjusted configuration of quasi-identifiers; and
        calculating, by the one or more data processors, the actual k-anonymity level based on the subsequent anonymized data.

3. The computer-implemented method of claim 1, further comprising:
    populating, by the one or more data processors, an anonymized data pool with the final anonymized data.

4. The computer-implemented method of claim 2, further comprising:
    populating, by the one or more data processors, an anonymized data pool with the subsequent anonymized data.

5. The computer-implemented method of claim 4, wherein the subsequent anonymized data contains records that are not in the anonymized data pool.

6. The computer-implemented method of claim 5, further comprising:
    decreasing, by the one or more data processors, the actual k-anonymity level, wherein a number of data records in the subsequent anonymized data is less than the actual k-anonymity level.

7. The computer-implemented method of claim 5, further comprising:
    maintaining, by the one or more data processors, the actual k-anonymity level, wherein a number of data records in the subsequent anonymized data is greater than or equal to the actual k-anonymity level.

8. The computer-implemented method of claim 4, wherein the subsequent anonymized data contains records that are in the anonymized data pool.

9. The computer-implemented method of claim 8, further comprising:
    increasing the actual k-anonymity level, wherein the subsequent anonymized data contains data records that correspond to all existing records in the anonymized data pool.

10. The computer-implemented method of claim 9, further comprising:
    maintaining the actual k-anonymity level, wherein the subsequent anonymized data contains data records that correspond to some of the existing records in the anonymized data pool.

11. A system for applying k-anonymity to data from a database, the system comprising:
    one or more data processors having memory storing instructions, which when executed result in operations comprising:
        performing an initial extraction of data from the database, comprising:
            extracting data from the database;
            producing initial anonymized data based on the extracted data and a configuration of quasi-identifiers, the quasi-identifiers being attributes exploitable for identifying a person;

calculating an actual k-anonymity level based on the initial anonymized data;

comparing the actual k-anonymity level to a desired k-anonymity level;

adjusting the configuration of quasi-identifiers based on the comparing;

iteratively repeating the calculating, comparing, and adjusting until the actual k-anonymity level equals the desired k-anonymity level or the adjusted configuration of quasi-identifiers has reached a limit; and producing final anonymized data based on the adjusted configuration of quasi-identifiers;

wherein:
there are mandatory and optional quasi-identifiers;
the optional quasi-identifiers have priority identifiers;
all quasi-identifiers are included in a first iteration of the actual k-anonymity level calculation; and
optional quasi-identifiers are selectively dropped on a one-by-one basis from iterations of the actual k-anonymity level calculation subsequent to the first iteration based on their respective priority identifiers.

12. The system of claim 11, further comprising:
performing a subsequent extraction of data from the database, comprising:
extracting subsequent data from a database;
producing subsequent anonymized data based on the extracted subsequent data and the adjusted configuration of quasi-identifiers; and
calculating the actual k-anonymity level based on the subsequent anonymized data.

13. The system of claim 11, further comprising:
populating an anonymized data pool with the final anonymized data.

14. The system of claim 12, further comprising:
populating an anonymized data pool with the subsequent anonymized data.

15. The system of claim 14, wherein the subsequent anonymized data contains records that are not in the anonymized data pool.

16. The system of claim 15, further comprising:
decreasing the actual k-anonymity level, wherein a number of data records in the subsequent anonymized data is less than the actual k-anonymity level.

17. The system of claim 15, further comprising:
maintaining the actual k-anonymity level, wherein a number of data records in the subsequent anonymized data is greater than or equal to the actual k-anonymity level.

18. The system of claim 14, wherein the subsequent anonymized data contains records that are in the anonymized data pool.

19. The system of claim 18, further comprising:
increasing the actual k-anonymity level, wherein the subsequent anonymized data contains data records that correspond to all existing records in the anonymized data pool.

20. A non-transitory computer readable storage medium storing one or more programs configured to be executed by one or more data processors, the one or more programs comprising instructions for applying k-anonymity to data from a database, the instructions comprising:
performing an initial extraction of data from the database, comprising:
extracting, by the one or more data processors, data from the database;
producing, by the one or more data processors, initial anonymized data based on the extracted data and a configuration of quasi-identifiers, the quasi-identifiers being attributes exploitable for identifying a person;
calculating, by the one or more data processors, an actual k-anonymity level based on the initial anonymized data;
comparing, by the one or more data processors, the actual k-anonymity level to a desired k-anonymity level;
adjusting, by the one or more data processors, the configuration of quasi-identifiers based on the comparing;
iteratively repeating the calculating, comparing, and adjusting until the actual k-anonymity level equals the desired k-anonymity level or the adjusted configuration of quasi-identifiers has reached a limit; and
producing, by the one or more data processors, final anonymized data based on the adjusted configuration of quasi-identifiers;
wherein:
there are mandatory and optional quasi-identifiers;
the optional quasi-identifiers have priority identifiers;
all quasi-identifiers are included in a first iteration of the actual k-anonymity level calculation;
if the desired k-anonymity level is higher than the actual k-anonymity level, optional quasi-identifiers are selectively dropped on a one-by-one basis from each iteration of the actual k-anonymity level calculation based on their respective priority identifier subsequent to the first iteration until the desired k-anonymity level is reached.

* * * * *